(No Model.) 2 Sheets—Sheet 1.
A. FAY.
RUNNING GEAR FOR VEHICLES.
No. 492,762. Patented Feb. 28, 1893.
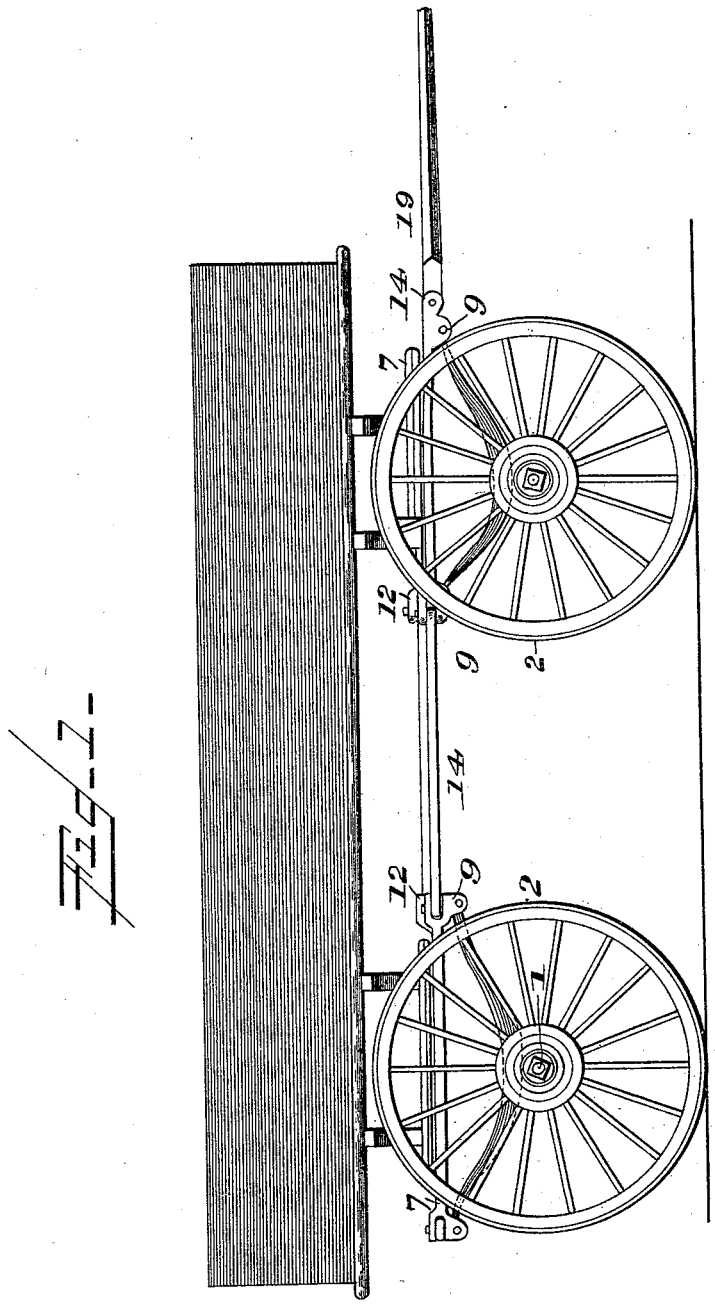
WITNESSES:
F. L. Ourand
W. L. Coombs
INVENTOR:
Alpheus Fay,
by Louis Bagger & Co.
Attorneys

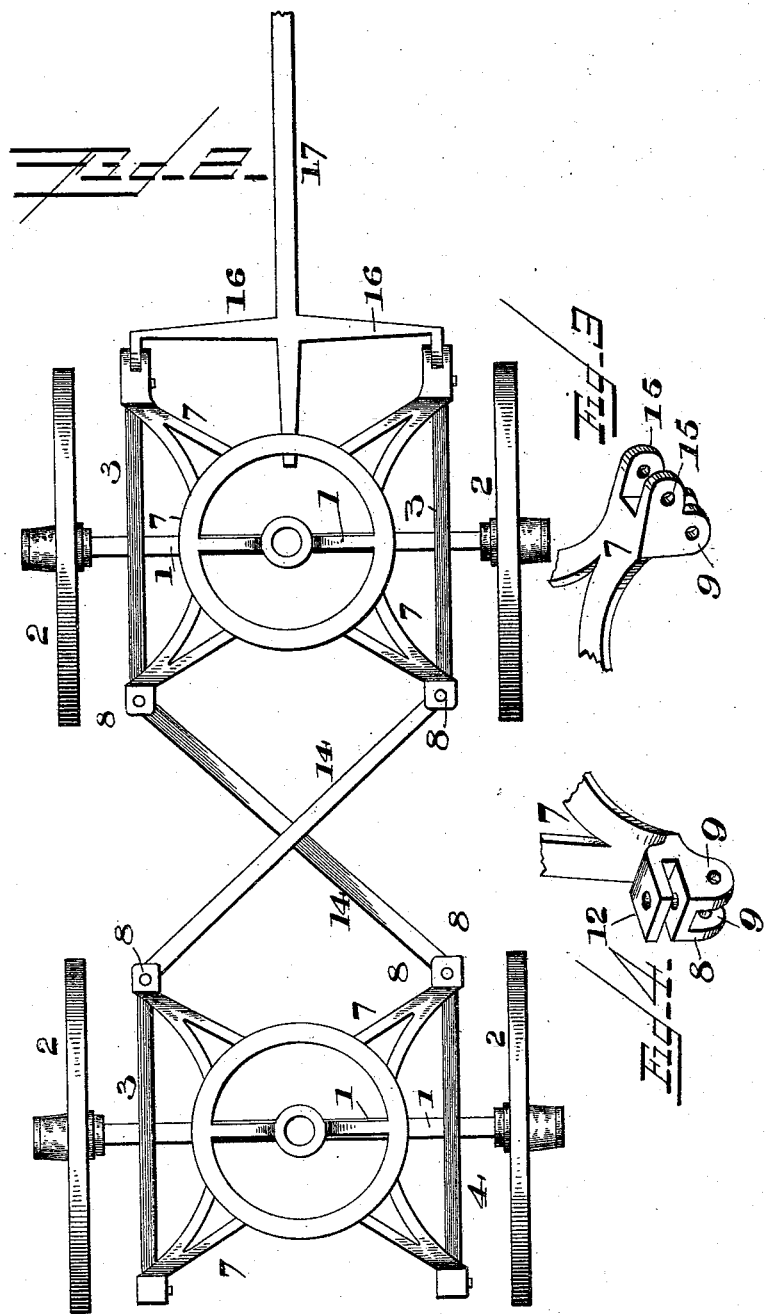

United States Patent Office.

ALPHEUS FAY, OF CINCINNATI, OHIO, ASSIGNOR TO CHARLES C. REAKIRT, JOSEPH H. CURLEY, AND EDWARD GEIS, OF SAME PLACE, AND JULIUS PROUSNITZER, OF NASHVILLE, TENNESSEE.

RUNNING-GEAR FOR VEHICLES.

SPECIFICATION forming part of Letters Patent No. 492,762, dated February 28, 1893.

Application filed August 3, 1892. Serial No. 442,052. (No model.)

*To all whom it may concern:*

Be it known that I, ALPHEUS FAY, a citizen of the United States, and a resident of Cincinnati, in the county of Hamilton and State of Ohio, have invented certain new and useful Improvements in Running-Gears for Vehicles; and I do hereby declare that the following is a full, clear, and exact description of the invention, which will enable others skilled in the art to which it appertains to make and use the same, reference being had to the accompanying drawings, which form a part of this specification.

My invention relates to improvements in the running gear of wagons and other vehicles, the object being to provide a construction of same by which much shorter turns may be made and the wagon be more conveniently loaded and unloaded and the entrance and exit to buggies and carriages greatly facilitated.

The invention consists in the novel construction and combination of parts hereinafter fully described and claimed.

In the accompanying drawings: Figure 1 is a side elevation of a wagon constructed in accordance with my invention. Fig. 2 is a plan view of the same the wagon body being removed. Figs. 3 and 4 are detail views.

In the said drawings the reference numeral 1 designates the axles and 2 the wheels. To these axles are secured the horizontally adjustable front and hind side bars or springs 3 and 4. These side bars are secured to the axles and to the fifth wheel 5, by means of arms 7. The adjoining ends of both the front and rear arms 7 are formed with clips consisting of metal plates 8 provided with lugs 9 through which pass screw bolts, by which they are secured to the side bars or springs. These clips are provided with studs 12, to which are pivoted diagonal bars 14, which cross each other at or near their centers, and with the front and rear hounds together. The front arms 7 are provided with lugs 15 to which are pivoted bars 16, formed or connected with the tongue 17.

From the above it will be seen that when the front axle is turned, by means of the pivoted connecting bars, the rear axle will be correspondingly turned in the opposite direction, so that in turning curves or describing circles, the rear wheels will travel in the track of the front wheels. By this means very short turns can be made without liability of over-turning the vehicle and without unduly straining the running gear. The wheels can also be thrown entirely underneath the wagon body so that the operations of loading and unloading may be performed more efficiently than in the ordinary constructions.

Having thus described my invention, what I claim is—

In a vehicle the combination with the axles and the reach, of the fifth wheels to which the wagon body is connected, the arms secured to said fifth wheels having clips formed with vertical and horizontal lugs, the diagonal bars secured to said horizontal lugs, and the side bars or springs secured to the axles and pivoted to the vertical lugs, substantially as described.

In testimony that I claim the foregoing as my own I have hereunto affixed my signature in presence of two witnesses.

ALPHEUS FAY.

Witnesses:
DAVID S. VANPELT,
J. J. RIDDLE.